(12) United States Patent
Chen et al.

(10) Patent No.: US 12,615,131 B1
(45) Date of Patent: Apr. 28, 2026

(54) DIGITAL CALIBRATION OF NON-LINEARITY IN A PROGRAMMABLE CLOCK PHASE CIRCUIT

(71) Applicant: Synopsys, Inc., Sunnyvale, CA (US)

(72) Inventors: Jin Chen, Eindhoven (NL); David J. Rennie, Mississauga (CA); Christopher Falkingham, Toronto (CA); Ryan A. Scott, Fenwick (CA); Nash Gould, Mississauga (CA); Michael R. Foxcroft, Toronto (CA)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 18/775,948

(22) Filed: Jul. 17, 2024

Related U.S. Application Data

(60) Provisional application No. 63/595,245, filed on Nov. 1, 2023.

(51) Int. Cl.
H04L 7/033 (2006.01)

(52) U.S. Cl.
CPC ................................... H04L 7/033 (2013.01)

(58) Field of Classification Search
CPC ...................................................... H04L 7/033
See application file for complete search history.

(56) References Cited

U.S. PATENT DOCUMENTS

| | | | |
|---|---|---|---|
| 2002/0089356 A1* | 7/2002 | Perrott | H03L 7/085 327/156 |
| 2005/0030076 A1* | 2/2005 | Mohanavelu | H03K 5/145 327/165 |
| 2005/0093591 A1* | 5/2005 | Rhee | H03L 7/0816 327/156 |
| 2010/0046683 A1* | 2/2010 | Beukema | H04L 7/0062 375/355 |
| 2014/0035638 A1* | 2/2014 | Bode | H03L 7/183 327/156 |
| 2014/0159789 A1* | 6/2014 | Ku | H03L 7/0814 327/158 |
| 2018/0159678 A1* | 6/2018 | Cho | H03L 7/093 |

* cited by examiner

*Primary Examiner* — Chieh M Fan

(74) *Attorney, Agent, or Firm* — Patterson + Sheridan, LLP

(57) ABSTRACT

A system and method for performing digital calibration of non-linearity in a circuit is presented. The circuit includes a phase detector, a statistics gathering device, and a feedback device. The phase detector provides information regarding a relationship between a clock from the programmable clock phase circuit and a reference signal. The statistics gathering device is coupled to the phase detector. The statistics gathering device receives an output of the phase detector to measure linearity of the programmable clock phase circuit. The feedback device is coupled to the statistics gathering device. The feedback device controls a delay and adjusts a phase of the clock based on measured values received from the statistics gathering device.

20 Claims, 9 Drawing Sheets

DIGITAL CALIBRATION OF NON-LINEARITY IN A PROGRAMMABLE CLOCK PHASE CIRCUIT

RELATED APPLICATION

This application claims priority to and the benefit of U.S. Provisional Patent Application Ser. No. 63/595,245, entitled "DIGITAL CALIBRATION OF NON-LINEARITY IN A FRACTIONAL PLL AND A CDR CIRCUIT" filed Nov. 1, 2023, which is incorporated herein by reference in its entirety.

TECHNICAL FIELD

The present disclosure generally relates to an electric circuit. In particular, the present disclosure relates to digital calibration of non-linearity in a circuit having one or more fractional phase locked loops (PLLs) and/or one or more clock and data recovery (CDR) circuits.

BACKGROUND

In view of advancements in artificial intelligence (AI), telecommunication infrastructure and data centers may be upgraded to support an exponential increase in network traffic. One component in wired communication infrastructure is a serializer/deserializer (SerDes) including a transmitter and a receiver. SerDes is used for transmitting data from one place to another place through one or more channels. The data rate for wired communications doubles almost every few years. As such, the architecture of SerDes may be upgraded to support higher data rates. SerDes includes phase locked loops (PLLs) and/or clock and data recovery (CDR) circuits for supplying clocks to other circuits.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
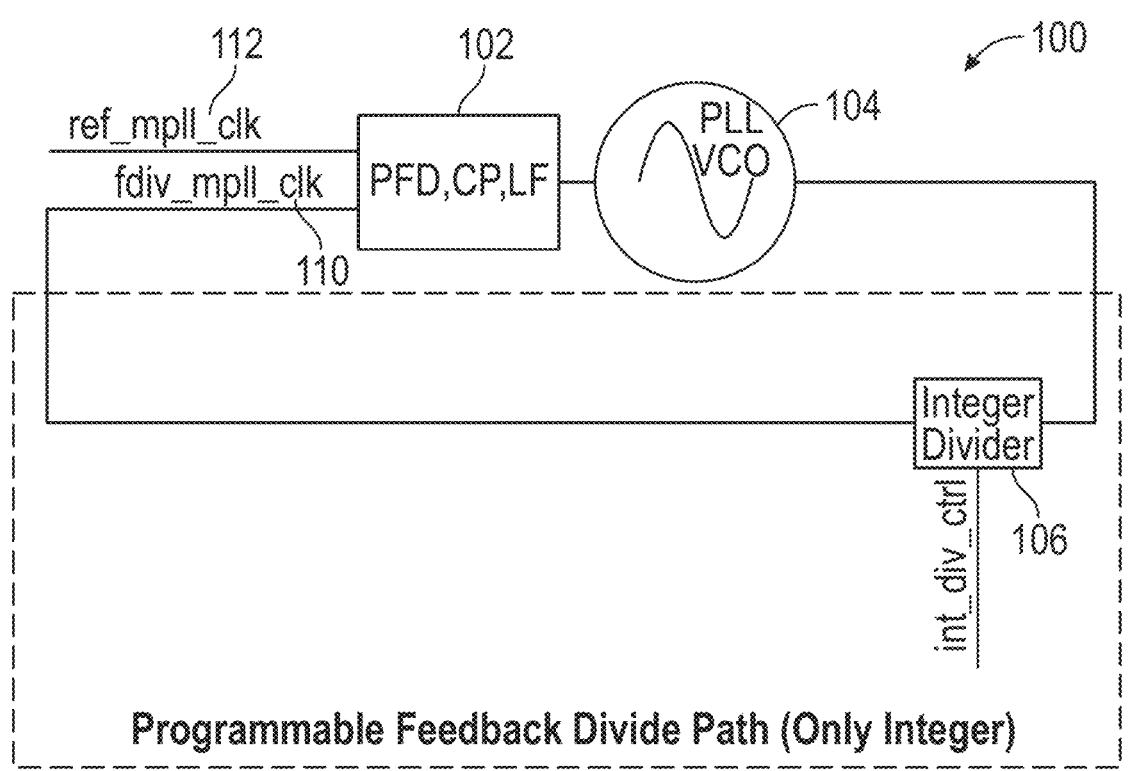
FIG. 1 illustrates an example block diagram of an integer-N phase locked loop (PLL).

Aspects of the present disclosure relate to digitally calibrating non-linearities by using a phase detector as a sense point, programming delay lines to perform the correction, and using digital logic to gather statistics to provide calibration.

In serializer/deserializer (SerDes) systems, phase locked loops (PLLs) and clock and data recovery (CDR) circuits supply clocks to other circuits. One component of many PLL and CDR circuits is a programmable clock phase block. If the linearity of the programmable clock phase block is degraded, the overall performance of the PLLs and/or CDR circuits may be limited, thus adversely affecting the SerDes. SerDes includes a transmitter and a receiver, and converts parallel data to serial data, and vice versa. The transmitter is a parallel-to-serial converter and the receiver is a serial-to-parallel converter. SerDes provides data transmission over a single line or single channel to minimize the number of input/output (I/O) pins and interconnects. The data is binary data. The binary data is transmitted as pulse widths using a certain modulation, one example being pulse amplitude modulation (PAM4).

With reference to PLLs, the basic components of a PLL circuit are a voltage-controlled oscillator (VCO), a phase-frequency detector (PFD), feedback and reference dividers, and a loop filter.

In a transmitter, a PLL is used to create a clock source of sufficient quality such that the transmitted output signal meets a specified level of jitter performance. In many use cases, it is beneficial that the feedback divide ratio of the PLL be a fractional divide ratio, as opposed to an integer divide ratio. One implementation of a fractional PLL includes a circuit block, which can control the phase of the feedback clock based on digital control codes. If the linearity of this programmable clock phase block is degraded, it may limit the overall performance of the PLL.

A fractional PLL is one where the VCO output clock is divided by feedback divider value N, where the value of N has both an integer and a fractional component. The fractional component of the divide ratio creates a frequency offset relative to the integer divide. A phase shift is introduced by the frequency offset. A fractional PLL may dither between two integer divide ratios to create an average divide ratio, which is non-integer. An improvement over the fractional PLL is to walk the phase of the clock in the feedback divide path in order to create an arbitrary frequency offset. One way to walk the phase of the clock is to implement a phase shift with a phase mixer (PMIX). However, non-idealities in the phase shifts degrade the performance of the PLL. For example, a non-ideal phase shift includes a phase shift that does not satisfy a phase shift requirement. Non-linear phase steps are a non-ideality, which can limit performance by increasing the deterministic jitter of the fractional PLL. In the past, at lower rates, this degradation was tolerable. However, as data rates have increased to 112 G (gigabit) and above, this may limit performance.

With reference to CDR circuits, in a receiver, the CDR circuit is used to track the incoming data signal. A CDR circuit implementation may include a programmable clock phase block, which controls the phase of a high-speed clock. The phase of the clock at the output of the programmable clock phase block is controlled with a digital control code in such a way that the phase of the clock signal is aligned with the incoming data signal. If the linearity of this programmable clock phase block is degraded, it may limit the overall performance of the receiver.

A receiver architecture is one where a clock is input from a PLL and a CDR circuit controls the phase of the sampling clock in order to align the clock phase with the incoming data signal. One way for the CDR circuit to control the phase of the clock is by using a PMIX circuit. A phase mixer is also known as a phase rotator. The PMIX performance can impact the overall performance of the receiver. Non-idealities in the programmed phase shifts may degrade the performance of the receiver. Non-linear phase steps are a non-ideality, which can limit performance. In the past, at lower rates, this degradation was tolerable. However, as data rates have increased to 112 G and above, this may limit or degrade performance.

In view of the limitations of both PLLs and CDR circuits, the example embodiments present a calibration method, which enables calibration of the linearity of a programmable clock phase circuit 202. By calibrating the linearity of these circuits, the performance of the related blocks can be optimized.

Figure 3A:
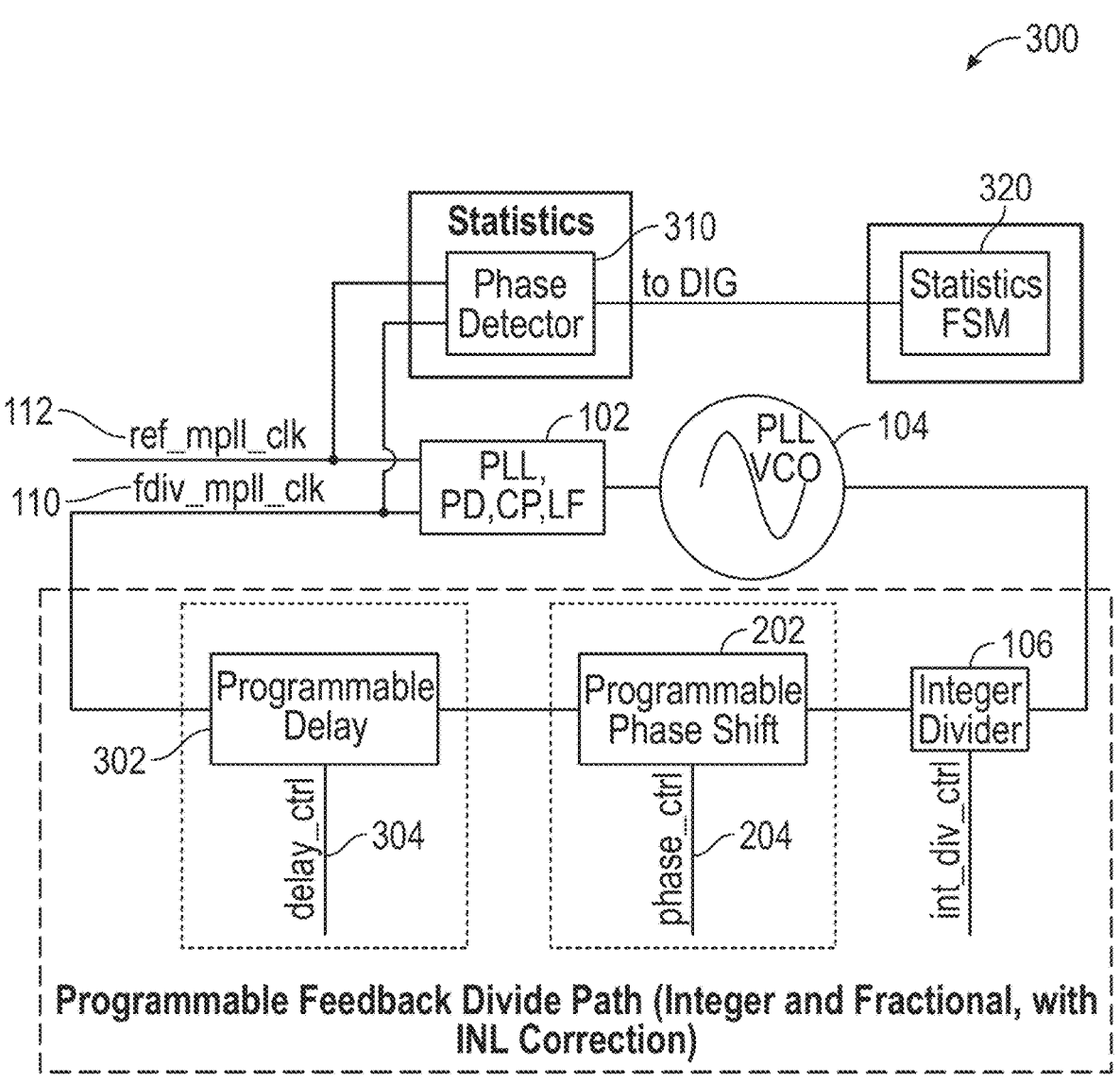
FIG. 3A illustrates an example block diagram of a fractional PLL incorporating an integral non-linearity (INL) calibration circuit.

The present disclosure includes a system having the following components, that is, a sensing circuit, a statistics gathering device or finite state machine (FSM) statistics block 320, and a feedback device (i.e., the programmable delay block 302), as shown in FIG. 3A.

The sensing circuit is a phase detector, which provides information regarding the relationship between the clock from the programmable clock phase circuit 202 and a reference. The reference may be another clock, or a data signal. There are numerous implementations of a phase detector, and the example apparatus is not based on a particular circuit, so long as it provides the beneficial information to the statistics gathering device. Beneficial information may include, e.g., synchronization information, frequency control information, error detection and correction information, and/or signal demodulation information. Synchronization information may include clock recovery and signal alignment data. Frequency control information may include stability and accuracy data. Error detection and correction information may include phase error detection and feedback control data.

The statistics gathering device takes the sensing circuit output and gathers statistics such that the average value of the sensing circuit output is measured for each setting of the programmable clock phase circuit 202. Settings of the programmable clock phase circuit 202 may include a phase offset setting, a frequency setting, a duty cycle setting, a phase resolution setting, a delay element setting, and/or a PLL setting. Using the statistics gathered by this device, the linearity of the programmable clock phase circuit 202 can be measured.

Based on the measured value of the statistics provided by the statistics gathering device or FSM statistics block 320, the feedback device (i.e., the programmable delay block 302) is used so that an output phase of the programmable clock phase circuit 202 is modified in order to move the output clock phase to a desired location. By this modification, the linearity of the programmable clock phase circuit 202 can be corrected.

There are several practical applications where it is useful to align a high-speed clock to a reference signal. In many practical applications, the quality of the aligned clock is important. One example of this is in high-speed SerDes protocols. In such SerDes protocols, the performance of clocks is defined by specifying the jitter, which is a metric that describes the deviation of the aligned clock phase relative to an ideal clock phase. As noted above, the example embodiments present a calibration method, which enables calibration of the linearity of a programmable clock phase circuit 202 to enhance the operation of PLLs and CDR circuits, which, in turn, enhances the operation of transmitters and receivers of SerDes systems (and high-speed SerDes protocols).

The present disclosure describes two embodiments, one where data calibration of non-linearities occurs for PLLs and one where data calibration of non-linearities occurs for CDR circuits. Both implementations use a phase detector 310 to gather statistics per code to update programmable delays.

As stated, one embodiment of the present disclosure is in a PLL, and, in particular, a fractional PLL. FIG. 1 illustrates an example block diagram of an integer-N phase locked loop (PLL). A PLL includes a PFD, a charge-pump (CP), a loop-filter (LF), collectively designated as circuit block 102, a VCO 104, and a feedback divider 106. The VCO 104 outputs a clock at a frequency determined by an input voltage. The feedback divider 106 takes the VCO output clock and divides it by a certain amount. The feedback clock 110 at the output of the feedback divider 106 is fed into the PFD. A second input to the PFD is a reference clock 112 that may be provided by a crystal oscillator. The PFD sends information regarding the phase relationship between the reference clock 112 and the feedback clock 110 to the charge-pump and loop-filter of circuit block 102. Based on this information, the voltage, which controls the frequency of the VCO 104, is updated. When the PLL is operating as desired, the frequency of the clock at the output of the VCO 104 is equal to the frequency of the reference clock 112 multiplied by the feedback divide ratio.

A PLL uses an integer-N feedback divide ratio. In an integer-N PLL, the feedback divide ratio is an integer, which means that the VCO frequency is an integer multiple of the reference clock frequency. In this PLL architecture, the feedback divide clock always has an edge, which can be aligned exactly with the VCO clock. A block diagram of an integer-N PLL circuit 100 is shown in FIG. 1.

The integer-N PLL circuit 100 performs frequency multiplication, via a negative feedback mechanism, to generate an output frequency in terms of the phase detector comparison frequency. To accomplish this, a reference clock 112 is provided to the phase detector. The phase detector uses the relationship between the reference clock 112 and the feedback clock 110 to tune the VCO 104 and, in a locked state, the frequency of the feedback clock 110 should be equal to the desired output frequency divided by N. Thus, a VCO frequency generated can be changed by reprogramming the divider N to a new value. By changing the value of N, the VCO 104 can be tuned across the frequency band of interest.

When the linearity of the fractional feedback divide path of a fractional PLL is not ideal, the jitter performance of the PLL is degraded relative to a PLL with an integer feedback divide path.

In a physical implementation of any circuit, there are non-idealities. Non-idealities in the circuit, which generate programmable phase shifts show up as errors in the actual phase generated, relative to an ideal phase. These non-ideal phases degrade the performance of the PLL by increasing the deterministic jitter of the fractional PLL. The increase in jitter may limit performance and prevent a physical interface (PHY) from meeting the jitter performance of a specification. PHY is responsible for coding and decoding of data between a purely digital system and the medium on which the signals are transmitted. PHY thus represents a bridge between the digital and electrical connection levels of the interface.

Figure 2:
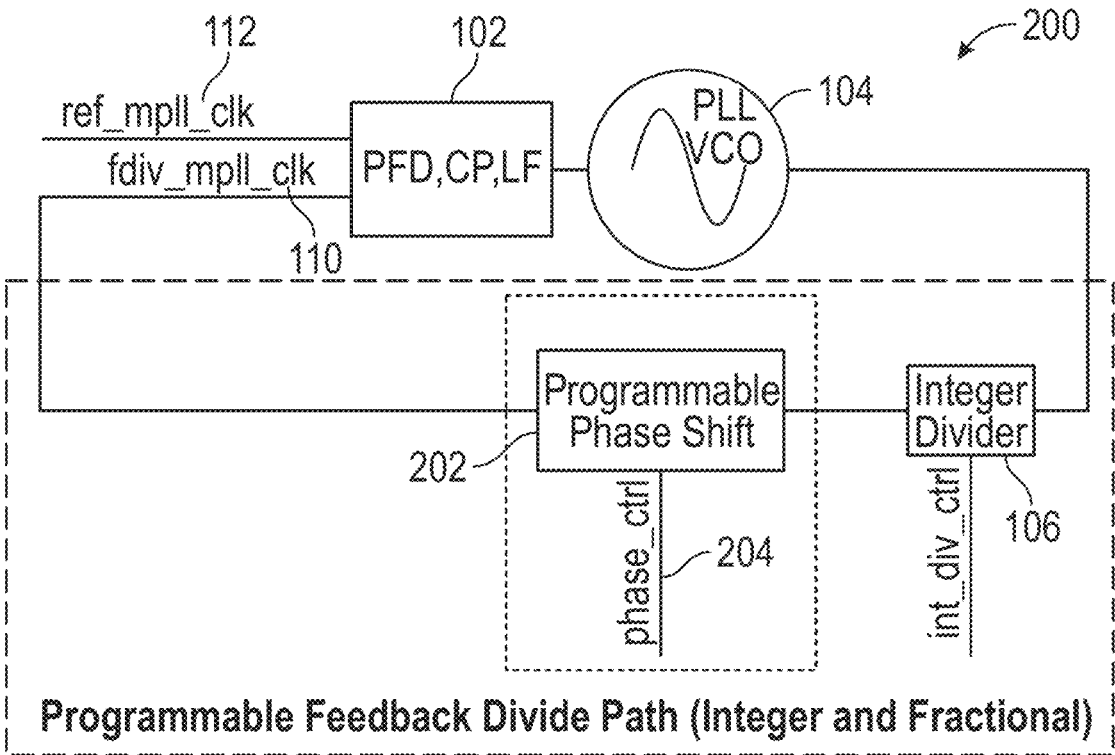
FIG. 2 illustrates an example block diagram of a fractional PLL.

There are some practical applications which benefit from a PLL having a fractional divide ratio. A block diagram of a fractional PLL circuit 200 is shown in FIG. 2. One way to implement the fractional PLL circuit 200 is by adding internal circuitry that enables the value of N to change dynamically during the locked state. If the value of the feedback divider 106 is switched between N and N+1 in the correct proportion, an average division ratio can be realized, that is, N plus some arbitrary fraction. This allows the phase detectors to run at a frequency that is higher than the synthesizer channel spacing. A further improvement is to implement an integer divider plus programmable clock phase circuit 202, as illustrated in FIG. 2. This implementation allows stepping of a feedback divider value with a granularity equal to a phase spacing of the programmable clock phase circuit 202.

As such, the present system can be used to calibrate the non-idealities in the programmable clock phase circuit 202 in the feedback divider path of the fractional PLL circuit 200.

The block diagram 300 of a PLL, which incorporates the present system is shown in FIG. 3A.

In this example, a programmable delay block 302 is added (also referred to as a feedback device), along with the phase detector 310, and the FSM statistics block 320 used for gathering statistics.

The FSM statistics block 320 may be implemented by software or hardware depending on specific requirements and constraints of the programmable clock phase circuit 202. In a software implementation, the FSM statistics block 320 may be implemented using state variables and conditional logic to transition between states. The FSM statistics block 320 may track a number of times each state is visited and how many times transitions occur between states. In a hardware implementation, the FSM statistics block 320 may be implemented using digital logic circuits. This may include using flip-flops to represent the state and combinational logic to determine state transitions. Software implementations are generally more flexible and easier to modify. Hardware implementations demand synthesis and potentially reprogramming or redesign of the circuit. Hardware implementations can be faster and more efficient in terms of power consumption, especially for high-speed applications. Complex FSMs with many states and transitions might be more manageable in software due to easier debugging and visualization tools. The choice between software and hardware typically depends on the application. Embedded systems with real-time constraints often use hardware FSMs, while less time-critical applications may use software FSMs. Both implementations aim to track and manage states and transitions effectively, and the choice between them depends on the specific needs and constraints of the system.

During operation of the PLL, the programmable phase shift is dynamically controlled by a digital code phase_ctrl 204. The digital code phase_ctrl 204 is provided by a PLL of the circuit block 102. In the FSM statistics block 320, the output signal 318 of the phase detector 310 is accumulated and filtered based on the value of the digital code phase_ctrl 204. The output 318 of the phase detector 310 is accumulated and filtered to provide a stable control signal. The phase detector 310 compares the phase of the reference signal with the phase of a feedback signal. The phase detector 310 then generates an error signal proportional to the phase difference between the two signals. The error signal is accumulated over time to integrate the phase error. This can be accomplished using a digital integrator or an accumulator (not shown). The accumulation helps in averaging out the phase errors over time, which can improve the stability and accuracy of the PLL of the circuit block 102. The phase detector 310 is filtered using, e.g., a low-pass filter.

Figure 3B:
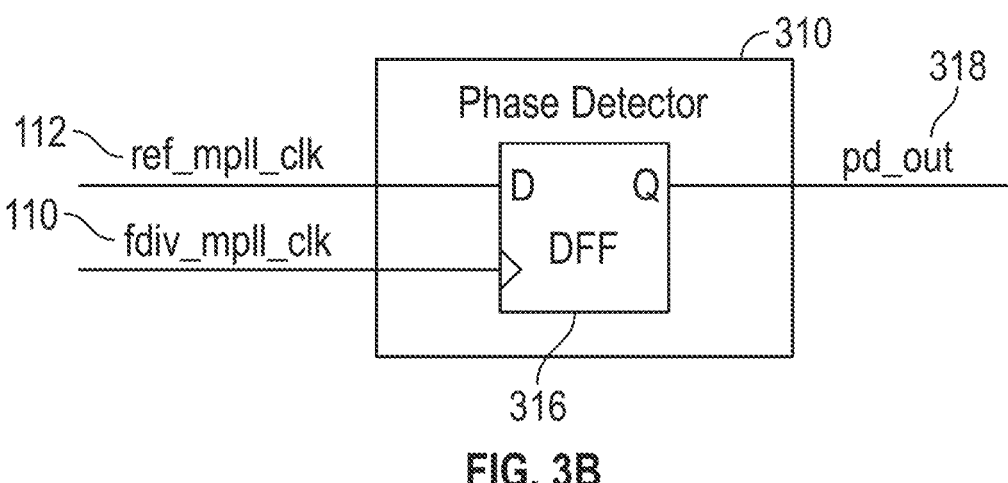
FIG. 3B illustrates an example phase detector.

In FIG. 3B, the phase detector 310 receives a first signal and a second signal. The first signal is the feedback clock 110 and the second signal is the reference clock 112. The phase detector 310 may include, e.g., a flip flop 316. In one example, the flip-flop may be a D flip-flop. The output of the phase detector 310 is output signal 318, which may be designated as pd_out.

Figure 3C:
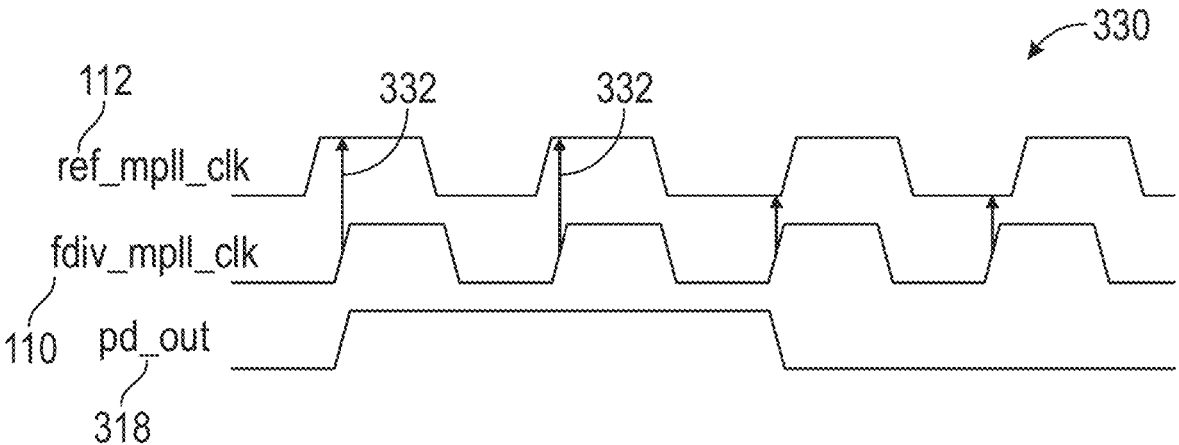
FIG. 3C illustrates an example output waveform and output signal of the phase detector.

FIG. 3C illustrates a timing diagram 330 depicting the first signal and the second signal received by the phase detector 310, as well as the output signal 318. The arrows 332 indicate that the reference clock 112 (second signal) is sampled on the rising edge of the feedback clock 110 (first signal). The output signal 318 is a binary output signal, which indicates whether the reference clock 122 is leading or lagging the feedback clock 110.

Figure 3D:
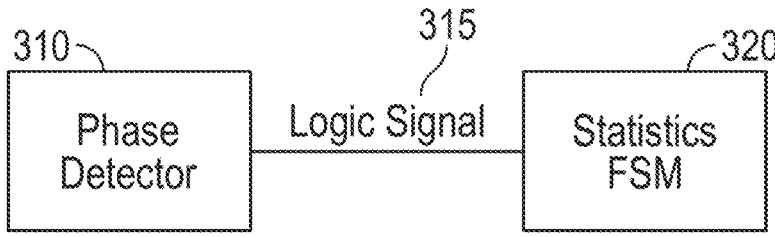
FIG. 3D illustrates the output signal provided from the phase detector to the finite state machine (FSM) statistics block.

FIG. 3D illustrates a logic signal 315 fed to the FSM statistics block 320 from the phase detector 310. The phase detector 310 compares two signals (i.e., the first signal and the second signal) and outputs the logic signal 315 that represents the phase difference. The logic signal 315 indicates whether the input signal is leading or lagging the reference signal. Based on the output of the phase detector 310, the FSM statistics block 320 transitions between states to adjust the system's behavior, such as altering a clock signal or adjusting a frequency. The FSM statistics block 320 collects and analyzes data about the phase difference detected over time. The FSM statistics block 320 may calculate statistics such as average phase difference, variance, and other relevant metrics. The FSM statistics block 320 processes the input data (e.g., the logic signal 315) to provide insights into the system's performance.

In an ideal system, with no non-linearities, the data gathered for every value of the digital code phase_ctrl 204 would be equal. As such, reviewing deviations in the statistics provides information regarding the non-linearity which exists.

The calibration method provides feedback to the system to correct the non-linearity by controlling the delay in the added programmable delay block 302. Based on whether the accumulated data in the FSM statistics block 320 shows that the phase of a feedback divide clock of the feedback divider 106 is too early or too late, the control code delay_ctrl 304 of the programmable delay block 302 (or feedback device) is incremented or decremented. The control code delay_ctrl 304 provides a connection between the FSM statistics block 320 and the programmable delay block 302 (i.e., feedback device). There can be a unique delay control code delay_ctrl 304 for every value of the digital code phase_ctrl 204. Once the calibration method has converged, the programmable delay block 302 applies a correction factor, such that the feedback divider clock going into the PFD has the ideal clock phase.

The FSM statistics block 320 monitors, records, and analyzes the behavior and performance of the FSM over time. The FSM statistics block 320 gathers data about the states and transitions, providing insights into debugging, optimization, and system performance evaluation. By monitoring the feedback divide clock of the feedback divider 106, the FSM statistics block 320 can modify the feedback via the control code delay_ctrl 304. The FSM statistics block 320 determines whether the feedback clock is a leading or lagging reference clock. The FSM statistics block 320 gathers the statistics data.

Therefore, according to FIGS. 3A-3D, digital codes (i.e., the digital code phase_ctrl 204, the control code delay_ctrl 304) control the phase shift in the feedback divide path of the fractional PLL. The phase detector 310 is used to gather statistics, via the FSM statistics block 320, on whether the feedback clock is leading or lagging the reference clock. The statistics of the phase detector 310's output is filtered based on the digital codes (i.e., the digital code phase_ctrl 204, the control code delay_ctrl 304). The statistics per digital code are accumulated and stored. In an ideal system, the statistics which are accumulated per code will average to zero, which implies an equal number of leading/lagging phase detector outputs. Non-ideality in the phase shift generation will change that balance. After statistics are gathered per code, programmable delays are updated in order to move the system toward the ideal state. The statistics are gathered, and delays are updated iteratively. As such, the phase detector 310 is used to gather statistics on the behavior of the feedback clock, and the programmable delay block 302 are utilized to calibrate the divide path such that it ends up in the ideal state in order to optimize the jitter performance of the fractional PLL.

Figure 4:
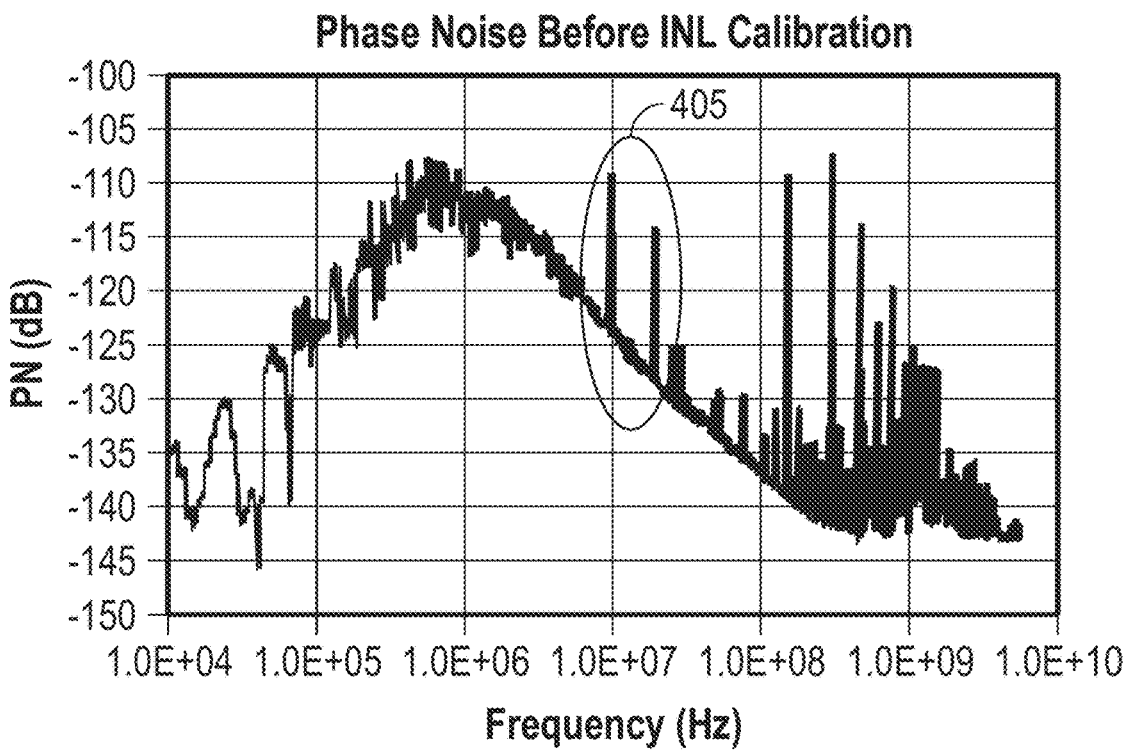
FIG. 4 illustrates example measured results providing PLL performance improvements with the INL calibration.
Figure 4:
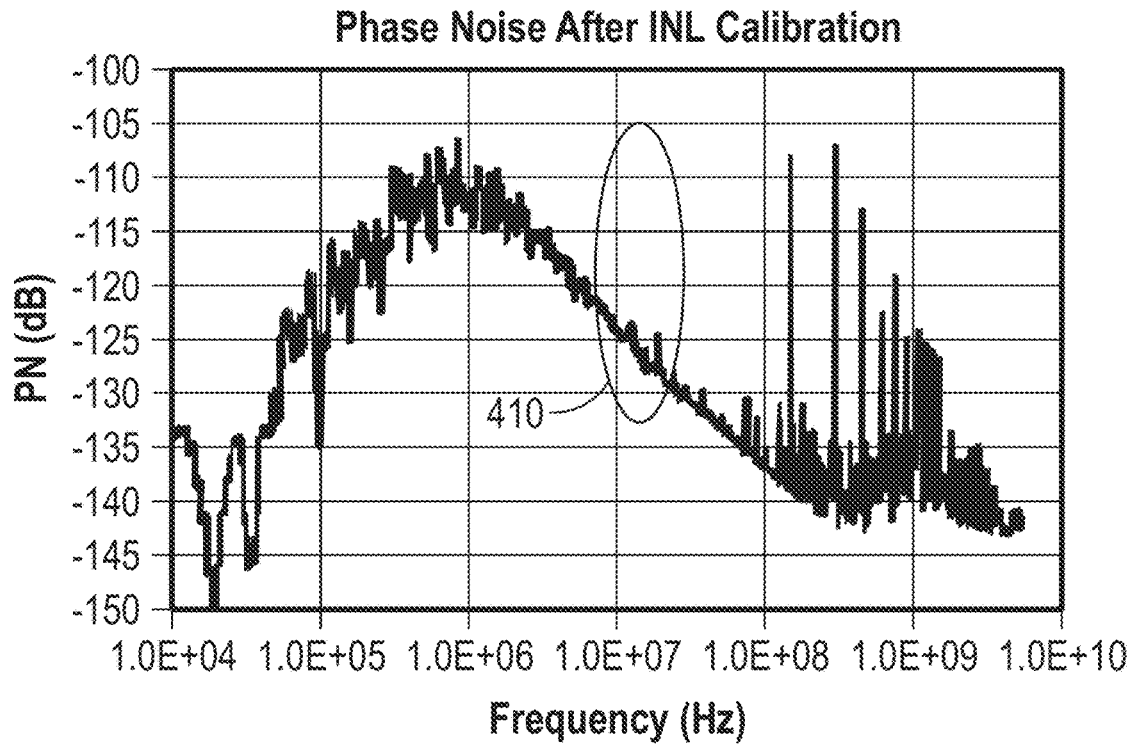

In one example, a test chip was implemented, which includes a fractional PLL with the present system. Simulation results before and after calibration are shown in FIG. 4. The spurious tones 405 in the phase noise profile at 10 MHz and 20 MHz have been removed by the integral non-linearity (INL) calibration (area 410). The measured results illustrate that the present system is able to calibrate the non-ideality in the feedback divider path of the fractional PLL, and in so doing, significantly improves the jitter performance of the PLL.

Figure 5:
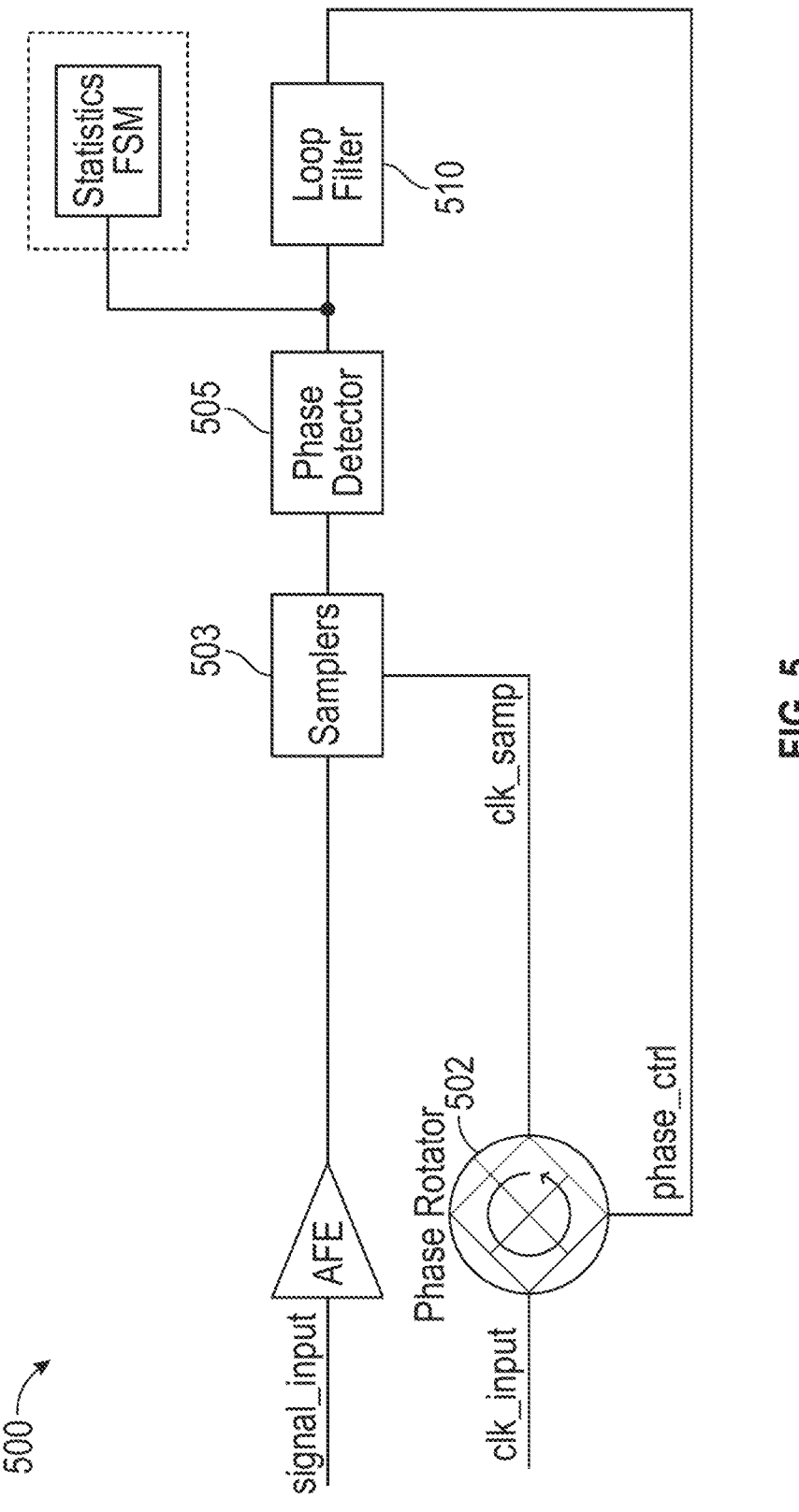
FIG. 5 illustrates an example phase rotator based clock and data recovery (CDR) circuit.

FIG. 5 illustrates an example phase rotator based CDR circuit 500.

As stated above, another embodiment of the present system is in a phase rotator based CDR circuit (as opposed to a PLL circuit). A receiver architecture has a clock path where the phase of the clock (or clocks) used to sample the data signal is defined by a phase rotator 502. The phase rotator 502 adjusts the phase of a high-speed input clock (clk_input) based on a control code (phase_ctrl) which comes from a digital loop filter 510. The digital loop filter 510 filters information, which comes from a phase detector 505. The phase detector 505 makes decisions regarding whether the clock is at the correct phase by using the outputs of the samplers 503. The block diagram of a receiver with this architecture is shown in FIG. 5.

The samplers 503 provide the phase detector 505 with signals that represent the timing information for phase comparison and synchronization. The samplers 503 may provide sampled data signals and reference clock signals to the phase detector 505. The sampled data signals may be used to determine a timing relationship between the sampled data and a reference clock signal. The phase detector 505 compares the sampled data signal's timing with that of the reference signal to detect phase differences. The phase detector 505 further compares the phase of the sampled data signal with the reference clock signal to determine the phase difference. This comparison helps in adjusting the timing of the system to maintain synchronization. Thus, the samplers 503 provide the phase detector 505 with sampled data signals that capture the timing information of the input signal at specific intervals. These sampled signals are compared against a reference clock signal by the phase detector 505 to determine phase differences.

Non-idealities in the phase rotator circuit show up as shifts in the phase of the clocks at the output of the circuit, relative to an ideal phase. These non-ideal clock phases degrade the performance of the receiver, leading to a degradation in a bit-error rate (BER) performance. In the past, at lower rates, this degradation was tolerable. However, as data rates have increased, the non-ideal clock phases may limit performance and prevent a PHY from meeting the desired jitter performance of a specification.

Figure 6:
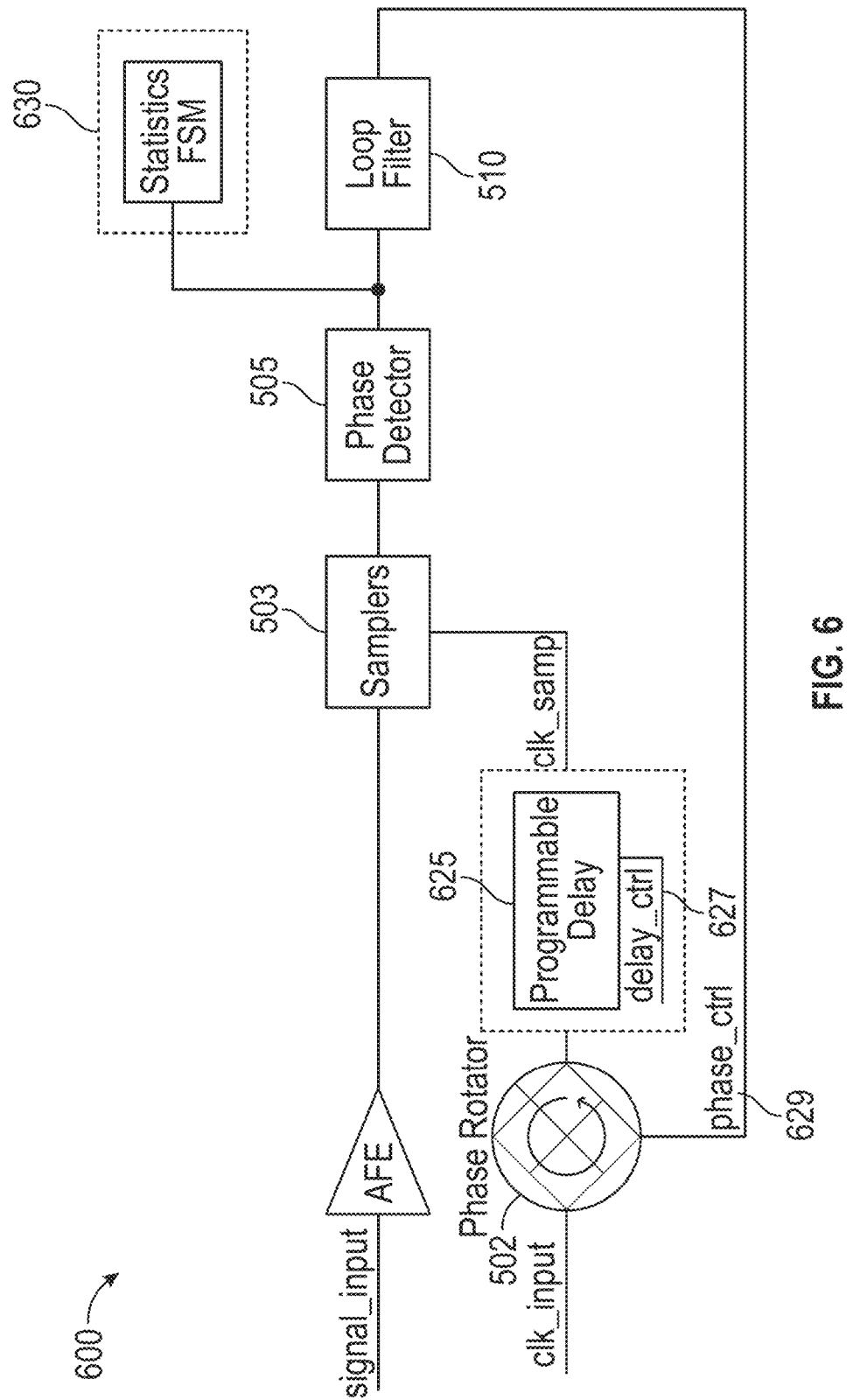
FIG. 6 illustrates an example phase rotator based CDR circuit incorporating an INL calibration circuit.

FIG. 6 illustrates an example phase rotator based CDR circuit 600 with an INL calibration circuit.

The present system can be used to calibrate the non-idealities in the phase rotator 502. The block diagram of a receiver, which incorporates the present system is shown in FIG. 6. In this receiver, a programmable delay block 625 is added (also referred to as a feedback device), along with a digital or statistics FSM 630 used for gathering statistics. During operation of the CDR, the phase rotator 502 is dynamically controlled by a digital code phase_ctrl 629. In the statistics FSM 630, the output of the phase detector 505 is accumulated and filtered based on the value of the digital code phase_ctrl 629. In an ideal system, with no non-linearities, the data gathered for every value of the digital code phase_ctrl 629 would be equal. As such, deviations in the data provides information regarding the non-linearity which exists.

The calibration method can then provide feedback to the system to correct the non-linearity by controlling the delay (i.e., a control code delay_ctrl 627) in the added programmable delay block 625. The control code delay_ctrl 627 provides a connection between the statistics FSM 630 and the programmable delay block 625 (i.e., feedback device). There can be a unique delay value for every value of the digital code phase_ctrl 629.

Based on whether the accumulated data in the statistics FSM 630 shows that the sampling clock is too early or too late for a certain value of the digital code phase_ctrl 629, the control code delay_ctrl 627 of the programmable delay block 625 is incremented or decremented. There can be a unique delay control code delay_ctrl 627 for every value of the digital code phase_ctrl 629. Once the calibration method has converged, the programmable delay block 625 applies a correction factor, such that the clock going into the samplers has the ideal clock phase.

Therefore, according to FIG. 6, digital codes (i.e., the control code delay_ctrl 627, the digital code phase_ctrl 629) control the phase shift in the sampling clock path in the receiver. Data from the phase detector 505 in the CDR circuit is gathered in order to determine the PMIX characteristics. The statistics of the phase detector's output is filtered based on the phase mixer code. The statistics per code are accumulated and stored. Information regarding all non-linearity and mismatch through the whole path are captured in the statistics. In an ideal system, the statistics which are accumulated per code will average to zero, which implies an equal number of leading/lagging phase detector outputs. Non-ideality in the phase generation will change that balance. After statistics are gathered per code, programmable delays are updated in order to move the system toward the ideal state. The statistics are thus gathered, and delays are updated iteratively. This scheme corrects non-linearity in a non-destructive manner, so it can be performed at startup and in mission-mode (i.e., during runtime). As such, a phase detector 505 is used to gather statistics, via the statistics FSM 630, on the behavior of the phase generation, and the programmable delay block 625 are utilized in order to calibrate the phase generation path such that the clocks used in the receiver sampling path end up in the ideal state in order to optimize the performance of the receiver.

Figure 7:
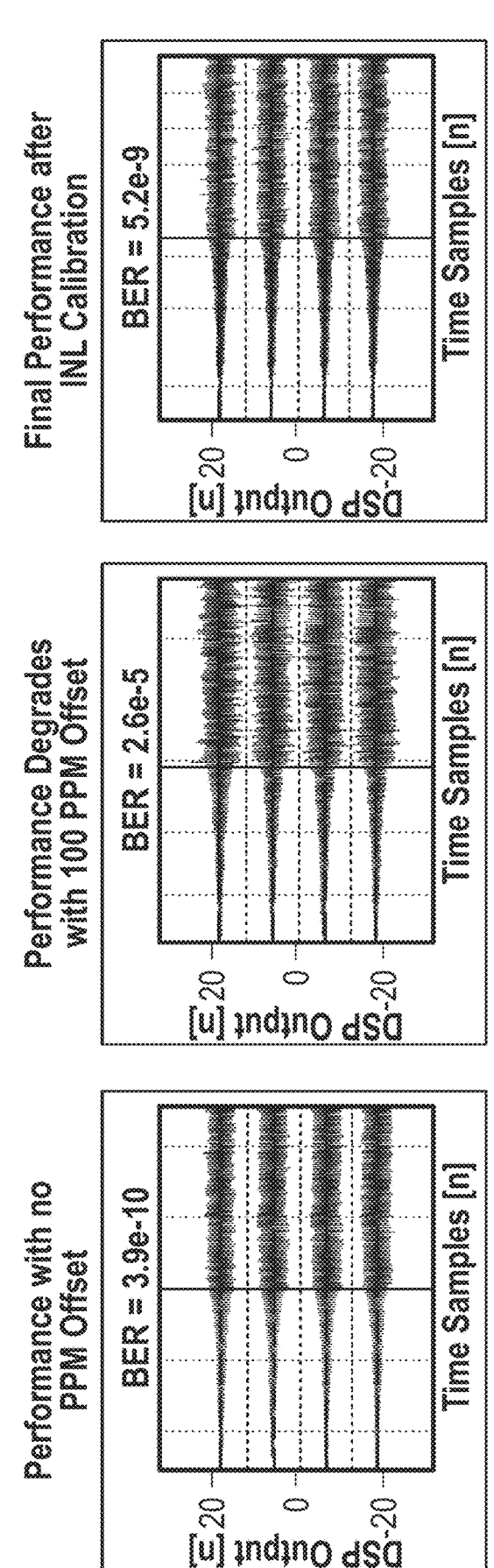
FIG. 7 illustrates example measured results providing receiver performance improvements with INL calibration.

FIG. 7 illustrates example measured results 700 providing receiver performance improvements with INL calibration.

In one example, a test chip was implemented, which includes a receiver with the present system. Simulation results before and after calibration are shown in FIG. 7. The results show the measured BER of the receiver on the test chip before and after calibration. A 100 points per million (PPM) deviation in the data rate of the incoming signal is added to exercise the non-linearity, and this results in a degradation in performance. With a 100 PPM offset, the BER increases from 3.9e-10 to 2.6e-5. The CDR INL calibration adjusts the programmable delays inside the receiver, and is able to recover most of the performance degradation, as post-calibration the BER improves to 5.2e-9.

The measured results illustrate that the present system is able to calibrate the non-ideality in the phase rotator path of the CDR circuit, and in so doing, improves the BER performance of the receiver.

In conclusion, the present disclosure describes a system and method that enables calibration of the linearity of a programmable clock phase circuit used in aligning a high-speed clock to a reference signal. By calibrating the linearity of the programmable clock phase circuit, the performance of the overall system is optimized. In one example, non-linearities are digitally calibrated, using a phase detector as a sense point, programmable delay lines to do the correction, and digital logic to gather statistics and implement the calibration method. In one instance, the calibration of non-linearity, e.g., in the feedback path of a fractional divide PLL is employed. The phase detector is used to gather statistics on the behavior of the feedback clock, and programmable delays are utilized in order to calibrate the divide path such that it ends up in the ideal state to optimize the jitter performance of the fractional PLL. In another example, the calibration of non-linearity, e.g., in a phase detector of a CDR circuit is employed. The phase detector in the CDR circuit is used to gather statistics on the behavior of the phase generation, and programmable delays are employed in order to calibrate the phase generation path such that the clocks used in the receiver sampling path of the CDR circuit end up in the ideal state to optimize the performance of the receiver. As such, both implementations include making use of a phase detector to gather statistics per code to update programmable delays.

Figure 8:
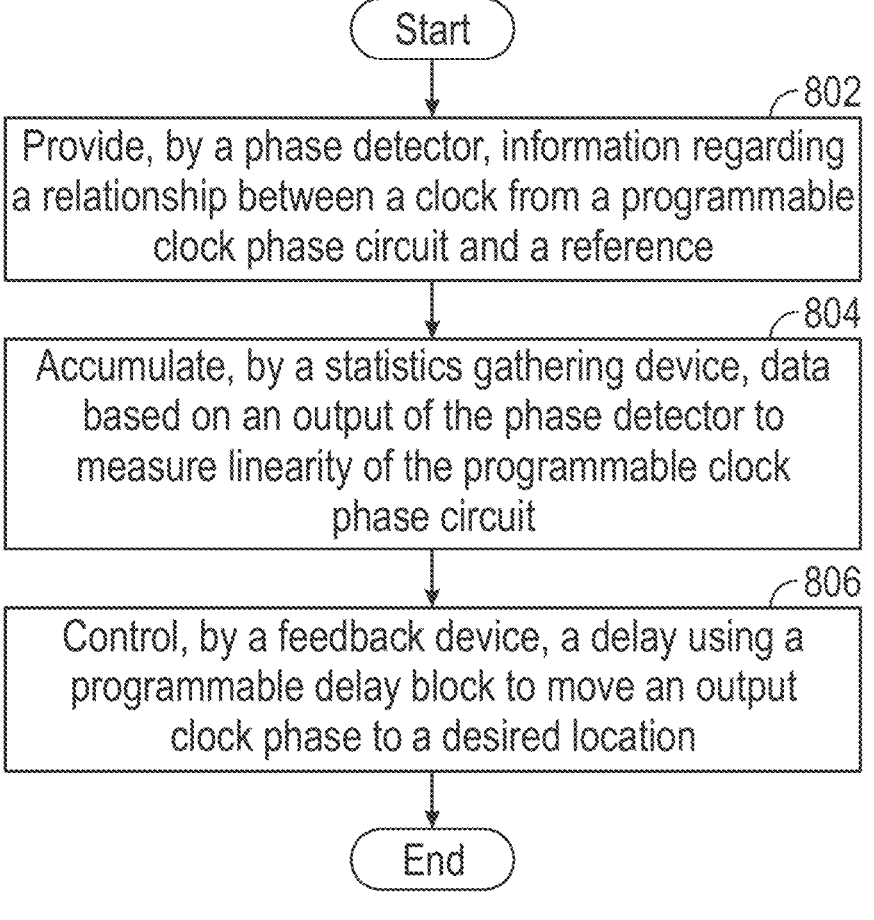
FIG. 8 is a flowchart of an example method for performing digital calibration of non-linearity in a circuit.

FIG. 8 is a flowchart of an example method for performing digital calibration of non-linearity in a circuit.

At 802, information is provided, by a phase detector, regarding a relationship between a clock from a programmable clock phase circuit and a reference. The phase detector can be referred to as a sensing circuit. The reference can be another clock or data signal.

At 804, data is accumulated, by a statistics gathering device, based on an output of the phase detector to measure linearity of the programmable clock phase circuit. The statistics gathering device takes the sensing circuit output and gathers statistics such that the average value of the sensing circuit output is measured for each setting of the programmable clock phase circuit. Using the gathered statistics, the linearity of the programmable clock phase circuit can be measured.

At 806, a delay is controlled, by a feedback device, using a programmable delay block to move an output clock phase to a desired location. As such, based on the measured value of the statistics, a feedback mechanism or device is used to so that the output phase of the programmable clock phase circuit is modified in order to move the output clock phase to the desired location. By this modification the linearity of the programmable clock phase circuit can be corrected. By calibrating the linearity of the programmable clock phase circuit, the performance of the overall system is optimized. In one example, non-linearities are digitally calibrated, using a phase detector as a sense point, programmable delay lines to do the correction, and digital logic to gather statistics and implement the calibration method.

The present disclosure describes systems and methods for aligning a high-speed clock to a reference signal. The present disclosure further relates to digitally calibrating non-linearities by using a phase detector as a sense point, programming delay lines to perform the correction, and using digital logic to gather statistics to implement a calibration method.

In one example, a circuit includes a phase detector to provide information regarding a relationship between a clock from a programmable clock phase circuit and a reference, a statistics gathering device to accumulate data based on an output of the phase detector to measure linearity of the programmable clock phase circuit, and a feedback device to control a delay using a programmable delay block to move an output clock phase to a desired location based on measured values received from the statistics gathering device.

In another example, a method for performing digital calibration of non-linearity in a circuit is presented, the method includes providing, by a phase detector, information regarding a relationship between a clock from a programmable clock phase circuit and a reference, accumulating, by a statistics gathering device, data based on an output of the phase detector to measure linearity of the programmable clock phase circuit, and controlling, by a feedback device, a delay using a programmable delay block to move an output clock phase to a desired location based on measured values received from the statistics gathering device.

In yet another example, a non-transitory computer readable medium includes stored instructions enabling digital calibration of non-linearity in a circuit is presented, which when executed by a processor, cause the processor to provide, by a phase detector, information regarding a relationship between a clock from a programmable clock phase circuit and a reference, accumulate, by a statistics gathering device, data based on an output of the phase detector to measure linearity of the programmable clock phase circuit, and, control, by a feedback device, a delay using a programmable delay block to move an output clock phase to a desired location based on measured values received from the statistics gathering device.

Figure 9:
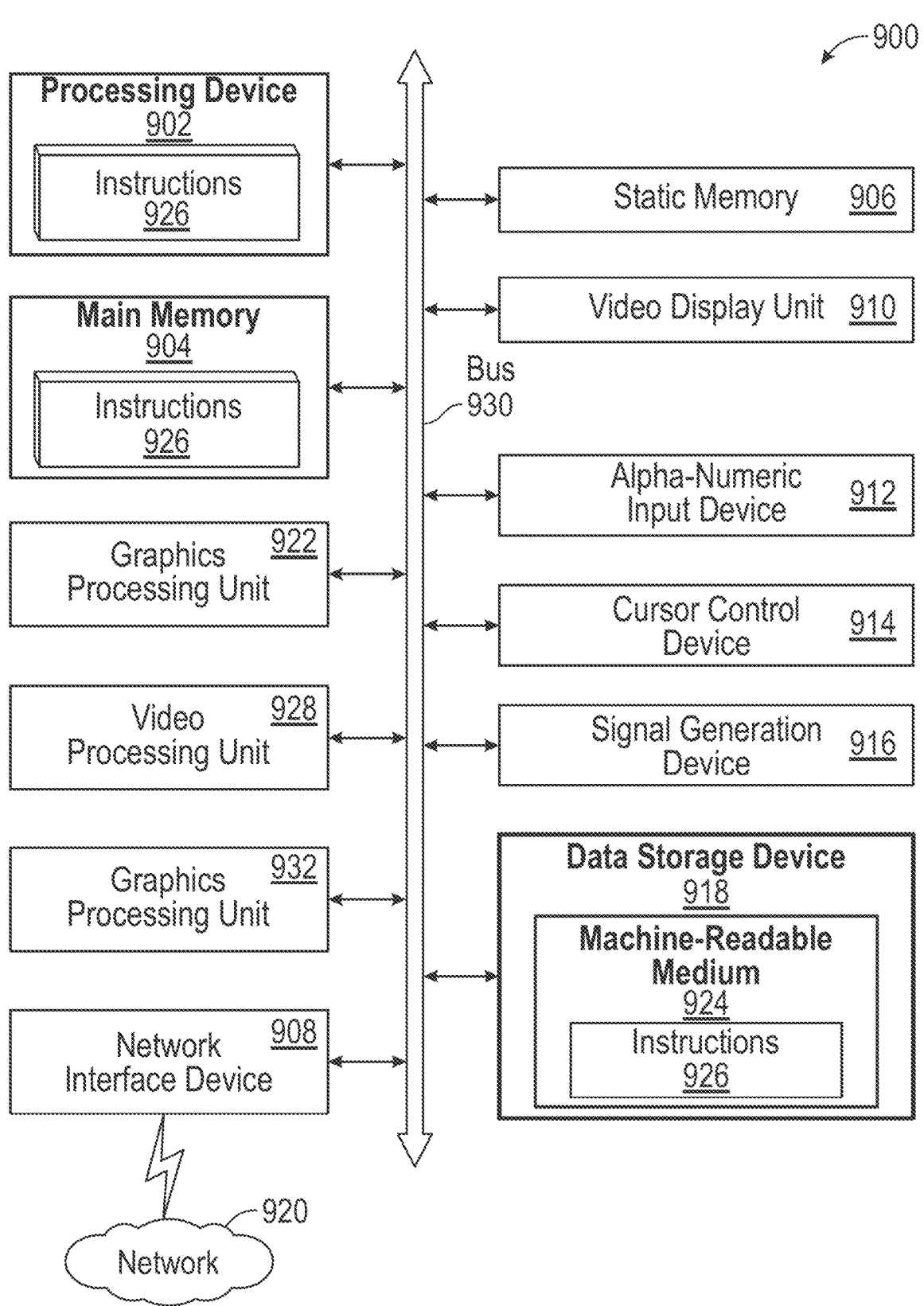
FIG. 9 illustrates an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a local area network (LAN), an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those benefiting from physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A circuit comprising:

a phase detector that compares a clock signal generated by a programmable clock phase circuit with a reference signal to generate digital phase comparison data indicative of a phase relationship between the clock signal and the reference signal;

a statistics gathering device that is coupled to the phase detector, wherein the statistics gathering device comprises a finite state machine (FSM) that accumulates the digital phase comparison data across multiple delay settings of the programmable clock phase circuit to generate calibration data; and a feedback device that is coupled to the statistics gathering device, wherein the feedback device applies digital correction values derived from the calibration data to control a delay and adjust a phase of the clock signal.

2. The circuit of claim 1, wherein the statistics gathering device computes a statistical measure of phase linearity for each of the multiple delay settings based on the accumulated digital phase comparison data.

3. The circuit of claim 1, wherein the statistics gathering device computes an average value of the digital phase comparison data for each of the multiple delay settings to determine a degree of phase linearity.

4. The circuit of claim 1, wherein the feedback circuit uses the delay to apply the digital correction values to calibrate and linearize a phase response of the programmable clock phase circuit.

5. The circuit of claim 1, wherein the circuit is implemented with a fractional phase locked loop (PLL).

6. The circuit of claim 5, wherein, during operation of the fractional PLL, a programmable phase shift of the clock signal generated by the programmable clock phase circuit is dynamically controlled by a digital code.

7. The circuit of claim 6, wherein the statistics gathering device accumulates and filters an output of the phase detector based on the digital code.

8. The circuit of claim 7, wherein the digital code is incremented or decremented based on a feedback divide clock of the feedback device.

9. The circuit of claim 1, wherein the circuit is implemented with a phase rotator based clock and data recovery (CDR) circuit.

10. The circuit of claim 9, wherein during operation of the phase rotator based CDR circuit, a phase rotator is controlled by a digital code.

11. The circuit of claim 10, wherein an output of the phase detector is accumulated and filtered based on the digital code.

12. The circuit of claim 11, wherein the digital code is incremented or decremented based on a feedback divide clock of the feedback device.

13. A method for performing digital calibration of non-linearity in a circuit, the method comprising:

comparing, by a phase detector, a clock signal generated by a programmable clock phase circuit with a reference signal to generate digital phase comparison data indicative of a phase relationship between the clock signal and the reference signal;

coupling a statistics gathering device that comprises a finite state machine (FSM) to the phase detector to accumulate the digital phase comparison data across multiple delay settings of the programmable clock phase circuit to generate calibration data; and applying, by a feedback device coupled to the statistics gathering device, digital correction values derived from the calibration data to control a delay and adjust a phase of the clock signal.

14. The method of claim 13, wherein the statistics gathering device computes an average value of the digital phase comparison data for each of the multiple delay settings to determine a degree of phase linearity.

15. The method of claim 13, wherein the feedback circuit uses the delay to apply the digital correction values to calibrate and linearize a phase response of the programmable clock phase circuit.

16. The method of claim 13, wherein the circuit is implemented with a fractional phase locked loop (PLL).

17. The method of claim 16, wherein, during operation of the fractional PLL, a programmable phase shift is dynamically controlled by a digital code, wherein an output of the phase detector is accumulated and filtered based on the digital code; and wherein the digital code is incremented or decremented based on a feedback divide clock of the feedback device.

18. The method of claim 13, wherein the circuit is implemented with phase rotator based clock and data recovery (CDR) circuit, wherein during operation of the phase rotator based CDR circuit, a phase rotator is controlled by a digital code; and wherein an output of the phase detector is accumulated and filtered based on the digital code.

19. The method of claim 18, further comprising incrementing or decrementing the digital code based on a feedback divide clock of the feedback device.

20. A non-transitory computer readable medium comprising stored instructions for performing digital calibration of non-linearity in a programmable clock phase circuit, which when executed by a processor, cause the processor to:

receive, by a statistics gathering device, digital phase comparison data generated by a phase detector that compares a clock signal from the programmable clock phase circuit with a reference signal;

accumulate, by the statistics gathering device comprising a finite state machine (FSM), the digital phase comparison data across multiple delay settings of the programmable clock phase circuit to generate calibration data; and apply, by a feedback device, digital correction values derived from the calibration data to control a programmable delay block and adjust a phase of the clock signal.

* * * * *